United States Patent
Nichols (10) Patent No.: US 12,111,952 B2
(45) Date of Patent: Oct. 8, 2024

(54) ANONYMIZED INTERFACE FOR TICKET BASED AUTHENTICATION

(71) Applicant: DRFIRST.COM, INC., Rockville, MD (US)

(72) Inventor: Christian Nichols, Diamond Bar, CA (US)

(73) Assignee: DrFirst.com, Inc., Rockville, MD (US)

( * ) Notice: Subject to any disclaimer, the term of this patent is extended or adjusted under 35 U.S.C. 154(b) by 278 days.

(21) Appl. No.: 16/948,596

(22) Filed: Sep. 24, 2020

(65) Prior Publication Data
US 2021/0383021 A1     Dec. 9, 2021

Related U.S. Application Data (60) Provisional application No. 62/705,070, filed on Jun. 9, 2020.

(51) Int. Cl.
*G06F 21/62*     (2013.01)
*G06F 9/451*     (2018.01)
*H04L 9/40*     (2022.01)

(52) U.S. Cl.
CPC ...... *G06F 21/6254* (2013.01); *H04L 63/0807* (2013.01); *H04L 63/105* (2013.01); *G06F 9/451* (2018.02)

(58) Field of Classification Search
CPC . G06F 21/6254; G06F 9/451; H04L 63/0807; H04L 63/105; H04L 63/0421
See application file for complete search history.

(56) References Cited

U.S. PATENT DOCUMENTS

| | | | |
|---|---|---|---|
| 9,871,769 B2 | 1/2018 | Gay et al. | |
| 10,686,781 B1 * | 6/2020 | Kaditz | H04L 67/10 |

(Continued)

FOREIGN PATENT DOCUMENTS

| | | | | |
|---|---|---|---|---|
| EP | 3605376 A1 | 2/2020 | | |
| WO | WO-2020183453 A1 * | 9/2020 | ......... | G06F 21/6245 |

OTHER PUBLICATIONS

Invitation to Pay Additional Fees and Partial International Search Report for PCT Application No. PCT/US2021/070664, mailed on Sep. 21, 2021, 18 pages.

(Continued)

*Primary Examiner* — Wasika Nipa
*Assistant Examiner* — Andrew Suh
(74) *Attorney, Agent, or Firm* — Brake Hughes Bellermann LLP (57) ABSTRACT

Method, system, and programs provide automatic anonymization of protected data items when a request is associated with authentication via a ticket. Ticket authentication includes sending a ticket to a recipient address. The ticket is included in a request for information. Responsive to receiving a request with a ticket, an example system may determine if the ticket is still valid and, if so, generate mock identifiers for any identifiers in information provided back to the requestor, replace the identifiers with their corresponding mock identifiers, as well as delete any protected information from the information provided back to the requestor. The system may store a mapping of the identifiers with their mock identifiers by session id. These mappings may be deleted after a predetermined time, so that the mapping is valid only for a particular session for a limited time.

20 Claims, 6 Drawing Sheets

(56) References Cited

U.S. PATENT DOCUMENTS

| | | | |
|---|---|---|---|
| 11,081,214 B1* | 8/2021 | Whitaker | G16H 10/60 |
| 2012/0222134 A1* | 8/2012 | Orsini | G06F 21/62 |
| | | | 726/28 |
| 2013/0191904 A1* | 7/2013 | Piliouras | G06Q 30/0269 |
| | | | 726/7 |
| 2016/0147945 A1 | 5/2016 | MacCarthy et al. | |
| 2017/0220771 A1* | 8/2017 | Toupin | G16H 20/10 |

OTHER PUBLICATIONS

Communication pursuant to Article 94(3) EPC for European Application No. 21736936.2, mailed Apr. 3, 2023, 9 pages.
Communication Under Rule 71(3) EPC for European Application No. 21736936.2, mailed Oct. 5, 2023, 8 pages.

* cited by examiner

ANONYMIZED INTERFACE FOR TICKET BASED AUTHENTICATION

RELATED APPLICATION

This application is a non-provisional of, and claims priority to, U.S. Provisional Application No. 62/705,070, filed Jun. 9, 2020, the disclosure of which is incorporated by reference in its entirety.

TECHNICAL FIELD

Systems and methods relate to providing access to information based on ticket presentation. More specifically, implementations relate to a user interface that automatically anatomizes identifiers and removes personal data from an interface when a ticket is presented for authentication.

BACKGROUND

User interfaces can offer different views of information based on different authorization levels or authorized roles. In some settings, compliance with internal or external rules or regulations may govern what information can and cannot be included in a user interface based on the authorization level. Therefore, many information systems require authentication (e.g., at least a username and password) before providing information about a person.

SUMMARY

Disclosed systems and methods provide an anonymized user interface in response to access via ticket presentation in addition to the user interface presented in response to access via authentication. The ticket may also be referred to as an invite code. The user interface may be configured to present protected information and include protected identifiers when accessed via authentication, e.g., successful verification of a username and password, but may lack protected information and replace protected identifiers with mock identifiers when accessed via ticket presentation. In some implementations, the ticket-based access may be generated as part of an invitation. The invitation may be for a particular subject entity. The invitation may be sent to an address associated with the subject entity. In some implementations, the invitation includes a string of numbers, letters, or combination of numbers and letters that serves as the ticket (ticket identifier or invite code). When presented with a request for information that includes a ticket, an example system may gather the information to be included in the user interface, but may generate mock identifiers for each protected identifier to be provided as part of the user interface. A mock identifier is a temporary system-generated identifier used to replace an authentic identifier. Mock identifiers are only valid for a specific session. In some implementations, the system may generate an entry in an identifier map for a session identifier. The session identifier may be generated after a ticket is validated. The entry may include the mock identifiers generated and pair each mock identifier with the protected identifier it replaces. Thus, the entry may contain one or more mock identifier-protected identifier pairs. In addition, protected information may be removed from the information provided in the user interface. The protected information may be provided if a user logs in via authentication but removed if a user accesses the user interface via ticket presentation. If generated, session identifier may be provided to the requestor as metadata, e.g., in the information provided to the user interface. Protected information includes any personal health information, any personally identifiable information, etc. Protected identifiers are protected information that is included in the information used by the user interface when accessed via ticket presentation, but such identifiers are mapped to mock identifiers tied to the session. Thus, the protected information is anonymized by either removal or replacement. Accordingly, implementations provide an automatically anonymized version of a user interface.

One or more of the implementations of the subject matter described herein can be implemented so as to realize one or more of the following advantages. For example, implementations offer easier access to information by not requiring a user to authenticate to access the information, but still keeping sensitive information protected. Thus, for example, a person can access their own personal data in response to an invitation, but all personally identifying information is anonymized so that it cannot be tied back to the person. This enables efficient code reuse as a single user interface can be used by both properly authenticated users, who can see the protected information, and non-authenticated users, who cannot see the protected information because it has either been removed entirely or has been translated to a string that carries no meaning outside of the identifier map. As another example, implementations may increase the number of patients provided with useful information relating to personal health data because the interface provides the information without requiring the patient to create and remember a login. Users in general are reluctant to generate too many logins. Thus, the requirement of full authentication prevents many patients from using useful services. Accordingly, implementations are able to reach more users while still protecting the identity of a particular patient and any personal health information. Implementations also provide a simple to use portal for researchers to request anonymized data for research purposes.

The details of one or more implementations are set forth in the accompanying drawings and the description below. Other features will be apparent from the description and drawings, and from the claims.

DETAILED DESCRIPTION

In the following detailed description, numerous specific details are set forth by way of examples in order to provide a thorough understanding of the relevant teachings. However, the relevant teachings may be practiced without such details. In other instances, well known methods, procedures, systems, components, and/or circuitry have been described at a relatively high-level, without detail, in order to avoid unnecessarily obscuring aspects of the disclosure.

Figure 1:
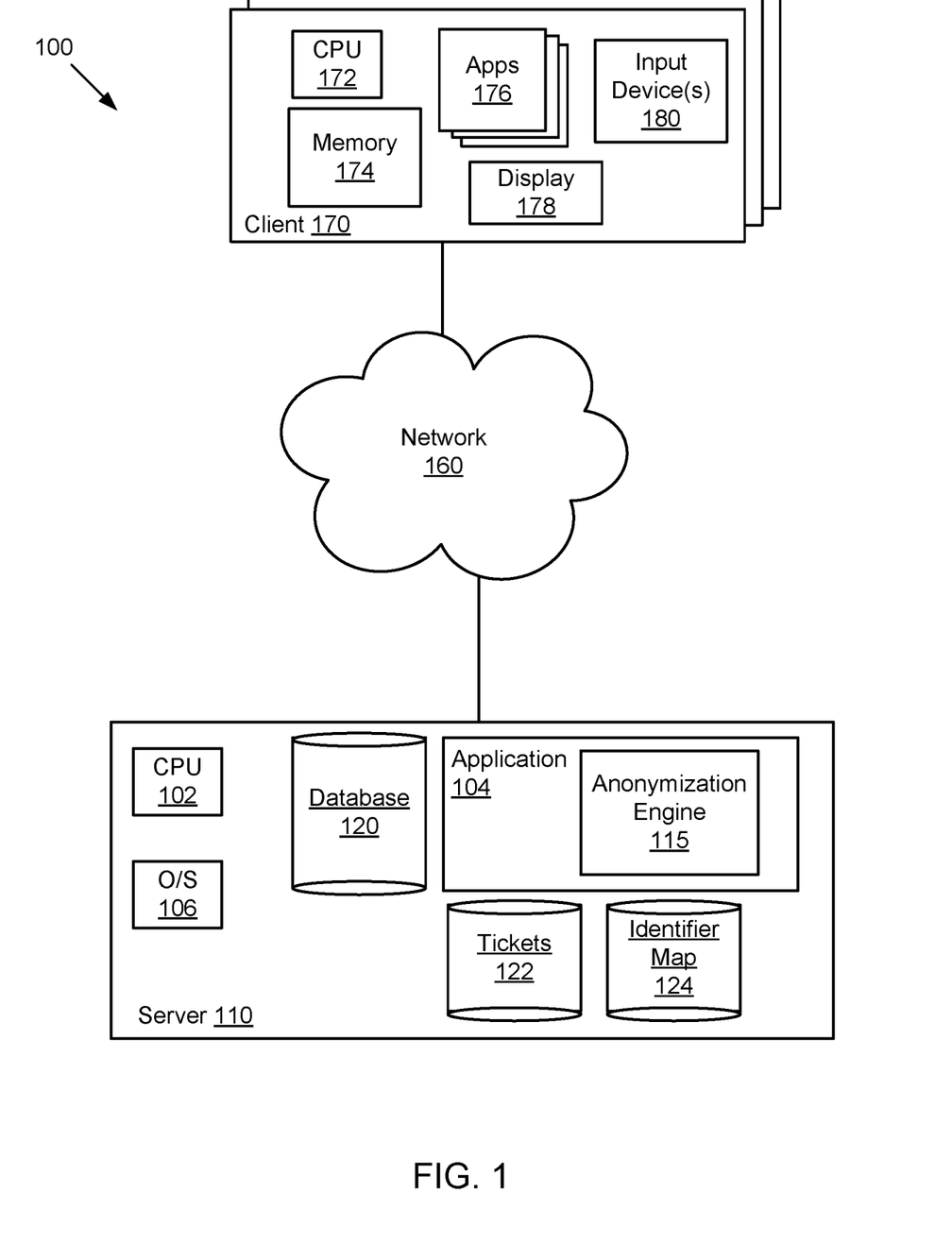
FIG. 1 describes a high-level depiction of a system configuration, according to a disclosed implementation.

FIG. 1 describes a high-level depiction of an automatic anonymization system 100 configuration, according to a disclosed implementation. The automatic anonymization system 100 may include a server 110. The server 110 may be a computing device or devices that take the form of a number of different devices, for example a standard server, a group of such servers, or a rack server system. In addition, in some implementations server 110 may be implemented in a personal computer or a group of personal computers. The server 110 may also be a distributed computing system. The server 110 may include a central processing unit 102, which may be one or more processors formed in a substrate configured to execute one or more machine executable instructions or pieces of software, firmware, or a combination thereof. The processors can be semiconductor-based— that is, the processors can include semiconductor material that can perform digital logic. The server 110 can also include an operating system 106 and one or more computer memories, for example a main memory, cache, storage disks, etc., configured to store one or more pieces of data, either temporarily, permanently, semi-permanently, or a combination thereof. The memory may include any type of storage device that stores information in a format that can be read and/or executed by the central processing unit 102. The memory may include volatile memory, non-volatile memory, or a combination thereof. The memory may store data, such as database 120, tickets data store 122, identifier map 124, etc., and/or one or more applications, including application 104. The applications, represented collectively by application 104, represent modules that, when executed by the central processing unit 102, perform specialized operations. In some implementations, application 104 may be stored in an external storage device and loaded into the memory of server 110. In some implementations, the server 110 may be a web-based healthcare enterprise system for a healthcare organization, such as, for example, for a hospital or a clinic, or an electronic medical records systems (EMR) for a healthcare provider's office.

The server 110 includes database 120. Database 120 is representative of all data obtained by the application 104 to generate a user interface. Thus, database 120 may represent a single database or several different databases. Database 120, or a portion thereof, may be distributed across a number of servers. Database 120, or a portion thereof, may be remote from but accessible to the server 110. The database 120 can be any data store in any kind of memory that enables particular items of data to be accessed by the application 104.

The application 104 may include or use an anonymization engine 115. The anonymization engine 115 enables the application 104 to provide access to a user interface via ticket presentation in addition to authentication. Application 104 may include several user interfaces, some of which may be available without authentication and some of which may be available via authentication. As used herein, authentication refers to the presentation and successful verification of credentials. Examples of credentials include a username and password, a biometric credential (voice print, fingerprint, face scan, etc.), a token generator, etc., and can include challenge questions and/or verification codes. End users can experience fatigue at having to create credentials to access their information. For example, patients generally resist creating credentials to access information from their physician's offices. But the information held by such offices is strictly controlled by rules and regulations and cannot be made available without compliance with these regulations. It is therefore difficult, conventionally, for healthcare professionals to provide relevant information to a patient if the patient does not create authentication credentials. Implementations provide anonymization engine 115, which enables application 104 to provide an anonymized version of the user interface to requests made via ticket presentation. The anonymized version of the user interface anonymizes any protected information, either removing it all together or replacing it with mock identifiers. This enables the user to access the user interface without having to create and enter credentials, which increases the likelihood of the user accessing the interface.

The anonymization engine 115 may generate a ticket, or invite code, for a subject entity. The ticket can be any string of characters (letters, numbers, special characters, etc.). As used herein, a ticket, invite code, and ticket identifier are synonymous, both referring to the string of characters. The anonymization engine 115 may generate the ticket in response to an event. For example, the anonymization engine may generate the ticket in response to a physician generating a new electronic prescription, in response to a professor entering a grade, in response to placing, shipping, or delivering an order, in response to a financial transaction, in response to payment of taxes, generation of a tax bill, etc. In some implementations, the anonymization engine 115 may generate the ticket in response to a subset of new prescription events, for example, if some physicians in a practice use the interface while others do not. As another example, the anonymization engine 115 may generate the ticket in response to a specific instruction to send an invitation. As another example, the anonymization engine 115 may generate the ticket in response to some other triggering criteria that is met, depending on the implementation.

In some implementations, the anonymization engine 115 may link a generated ticket to the subject entity for the event. For example, a ticket may be associated with an identifier for the subject entity in a data store, e.g., tickets data store 122. As another example, a ticket may be associated with a device identifier or communication address for the subject entity. The express association may be optional and the subject entity for a ticket may be derived from an identifier for a device responding to an invitation. Information about the generated ticket may be stored. For example, the anonymization engine 115 may store entries in tickets data store 122. The entries in tickets data store 122 may be valid for a predetermined time. As one example, the entry may be associated with a timestamp and be valid for a predetermined time after the time stamp or may expire after the timestamp. As another example, the entries may be deleted after a period of time, e.g., in a cache store that is refreshed periodically.

The anonymization engine 115 may generate an invitation for the subject entity that includes the ticket and is provided to an address associated with the subject entity, also referred to as a communication address. For example, the invitation may be sent to an account or a mobile phone number for the subject entity (e.g., the patient). Thus, the invitation may be a text message to a mobile device of the patient, such as a smart phone, tablet, or wearable device (smart watch, smart glasses, etc.). The invitation may also be an email sent to an account (e.g., email or social media account) of the patient. The address (e.g., phone number or account), may be part of the records in the database 120. For example, a patient may have given the address to a medical provider. The invitation may provide an opportunity for the user to opt-out of future invitations. The invitation may include a link with the ticket number. The link may be a link that the application 104 recognizes as requesting a particular user interface. Although described as being done by the anonymization engine 115, the generation of the ticket, e.g., in tickets data store 122, and/or the sending of the invitation with the ticket may be done by the application 104 or some other module of the server 110.

The application 104 may receive a request to view a user interface. The application 104 may be configured to determine whether the request is associated with a ticket presentation. For example, the application 104 may determine whether the request includes a valid ticket. A valid ticket is a ticket that has not expired. For example, a valid ticket may have an entry in the tickets data store 122 that has not expired. In some implementations, entries in the ticket data store 122 may expire after a predetermined time. The entry may be associated with a subject entity. If the request has a valid ticket, the application 104 may use an authorization level that is associated with ticket presentation in generating the user interface. This authorization level may include use of the anonymization engine 115 to anonymize the user interface. If the request is authenticated, e.g., is issued after verification of a username and password or similar credentials, the application 104 may use an authorization level that is associated with authentication. The authentication authorization level may grant access to various data elements of the user interface depending on the user's role, associated organization, etc., as is known. In some implementations, the request may not be associated with ticket presentation or with authentication and the application 104 may either disallow generation of the user interface or may provide certain elements of the user interface that do not rely on any protected data.

If a request is associated with ticket presentation, the anonymization engine 115 (and/or application 104) may generate a session identifier for the request. This enables the anonymization engine 115 to generate entries in the identifier map 124 that apply only to that particular session. The session identifier may accordingly be communicated back to the requesting client device. In some implementations, the session may end (expire) after some predetermined period of inactivity. In some implementations the session may end (expire) after some predetermined time regardless of activity. In some implementations the session may expire after some period of inactivity or after some predetermined time regardless of activity, the predetermined time being longer than the period of inactivity. For example, the system may consider a session expired after 1 hour of inactivity or after 6 hours regardless of activity. The entries in the identifier map 124 are not valid after the session ends and are unique to the session.

The application 104 gathers similar data from database 120 for ticket-based access and for authentication-based access of a subject entity. The difference is that the application 104 will use the anonymization engine 115 for ticket-based access but not authentication-based access. Thus, for any protected identifiers in the data obtained from the database 120 that will be used in the user interface, the anonymization engine 115 generates a mock identifier. The mock identifier-protected identifier pair is added to the identifier map 124 for the session identifier. The anonymization engine 115 also removes protected data from the user interface. Thus, for example, names, addresses, and age of the subject entity are removed from the data used in the user interface. What is defined as protected data, and thus removed or replaced by a mock identifier, is implementation dependent. Although described as being done by the anonymization engine 115, the generation of the entries in the identifier map 124, replacement of protected identifiers with mock identifiers, and removal of protected information from a user interface and any other function performed by the anonymization engine 115 may be performed by the application 104 or some other module of the server 110.

The server may be in communication with a plurality of clients 170 over a network 160. The network 160 may be for example, the Internet or the network 160 can be a wired or wireless local area network (LAN), wide area network (WAN), a cellular network, etc., implemented using, for example, gateway devices, bridges, switches, towers and/or so forth. Via the network 160, the server 110 may communicate with and transmit data to/from clients 170. In some implementations, automatic anonymization system 100 may be in communication with or include other computing devices (not shown) that provide updates to the database 120.

The client 170 may be any personal computing device, e.g., laptop, tablet, smart phone, cellular phone, smart watch, smart glasses, television with a processor, etc., The client 170 may be a computing device that is capable of receiving messages, such as text messages, short message service (SMS) messages, secure message service, instant messages, email, etc. In some implementations, the client 170 may be a mobile device identified by a phone number or user login. The client 170 may include a central processing unit 172, which may be one or more processors formed in a substrate configured to execute one or more machine executable instructions or pieces of software, firmware, or a combination thereof. The processors can be semiconductor-based—that is, the processors can include semiconductor material that can perform digital logic. The client 170 can also include an operating system and one or more computer memories 174, for example a main memory, configured to store one or more pieces of data, either temporarily, permanently, semi-permanently, or a combination thereof. The memory 174 may include any type of storage device that stores information in a format that can be read and/or executed by the central processing unit 172. The client 170 may also include one or more applications 176. The applications 176 may be mobile applications, e.g., applications downloaded from an app store that perform a specific function. The applications 176 may include web-enabled client applications. Thus, for example a client 170 may include an application 176 that works with application 104 to present one or more user interfaces on the client 170 using a browser. Thus, the applications 176 may also include an Internet browser. The client 170 may also include a display 178, such as an LCD or LED display, a touch screen display, etc., that displays images and text rendered by the applications 176. The client 170 may also include one or more input devices 180, which can include a touch-sensitive display, a mouse, a keyboard (including a keyboard displayed on display 178), etc. The application 104 may initiate display of the user interfaces on display 178, e.g., via instructions provided to an application 176.

Figure 2:
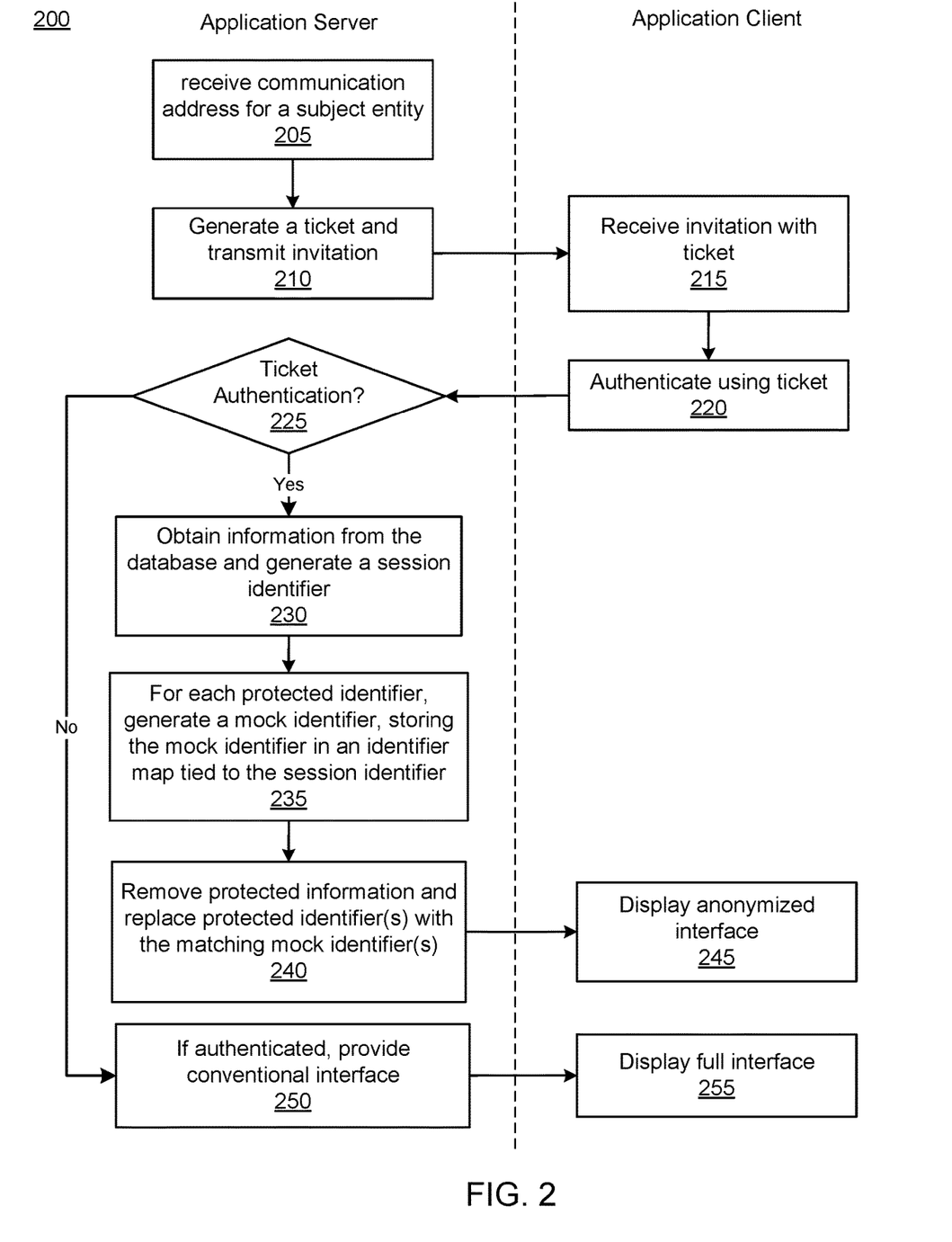
FIG. 2 illustrates a flowchart of an example process for providing an automatically anonymized version of a user interface, according to a disclosed implementation.

FIG. 2 illustrates a flowchart of an example process 200 for providing an automatically anonymized version of a user interface, according to a disclosed implementation. Process 200 may be executed by, for example, an automatic anonymization environment, such as system 100 of FIG. 1. The process 200 provides an automatically anonymized version of a user interface otherwise accessed via authentication.

The process 200 can be used in any setting where customers or clients might be hesitant to create a login to access the user interface. The process 200 thus provides a novel platform for communicating protected data outside of an authentication environment.

Process 200 may begin when the system receives a communication address for a subject entity (205). The system may receive the communication address in response to a triggering event. A triggering event is any event that triggers the sending of an invitation with a ticket to the communication address. Example triggering events include receiving a new electronic prescription, discharge from a hospital, determining a new financial transaction meets some criteria, a new grade entered for a university class, etc. In some implementations, the triggering event is an express instruction to send the invitation. Whatever the triggering event is, it may relate to a subject entity and the communication address is associated with the subject entity. Thus, there is some level of assurance that a communication sent to the communication address will reach the intended recipient (e.g., the subject entity, a guardian/owner of the subject entity, etc.). The system generates a ticket for an invitation to be sent to the communication address (210). The invitation includes the ticket, e.g., in a link or as part of some other control such as a button or selectable image/icon. In some implementations, the invitation may also include a mechanism for opting out of future invitations from future triggering events. As part of generating the ticket or invitation, in some implementations, the system may store a record in a data store that ties the generated ticket to the subject entity. Using this entry, the system can determine which subject entity a ticket is for. In other implementations, the system may infer the subject entity from an identifier of the device presenting the ticket. The ticket is a code or identifier generated by the system. The ticket may be used to uniquely identify the subject entity during a predetermined time frame. The ticket can be randomly generated. The ticket can be based on a time stamp. The ticket does not include any identifier already generated for the subject entity, e.g., any existing identifier for the subject entity in the database 120. The system sends the invitation that includes the ticket to the communication address. The invitation may also include an indication of which user interface is requested, e.g., as part of a link variable or as an API tied to the invitation.

At a client device associated with the communication address, the invitation is received (215). If/when the user of the client device accepts the invitation, e.g., by clicking on the link, button, or other control in the invitation, the client may send a request back to the server (220) that is interpreted by the server as a request to access a user interface via ticket presentation. The server may be configured to receive requests for the user interface via at least ticket presentation and via authentication. Thus, the user interface accessed via ticket presentation is similar to a user interface accessed via authentication, but with some information removed and some information replaced with temporary codes (mock identifiers). The user interface differs from a push notification in that it is an interactive interface and is not stored (e.g., in historical text messages) at the client device. If the user of the client does not accept the invitation, then process 200 effectively ends.

When the server receives (i.e., responsive to receiving) a request for the user interface, the server may determine whether the request is via ticket presentation or via authentication (225). Ticket presentation may be identified by the existence of a ticket in the request. Such a ticket is verified if the ticket in the request has not expired. For example, the system may search a data store for the presented ticket number. If no record exists in the data sore, the ticket is not valid. If the record exists but has expired, the ticket is not valid. In some implementations, the ticket may also be associated with a subject entity in the data store. If the ticket is not valid (225, No) the system may determine whether the request is associated with an authenticated session and, if so, provide the conventional version of the user interface (250). This user interface may be displayed at the client device (255). If the request is not associated with an authenticated session, an error may be returned or another interface may be returned (not shown).

If a valid ticket is presented with the request (225, Yes), the system obtains information from the database for the subject entity that is associated with the valid ticket (230). The information may be the same information that the system would obtain for a request associated with an authenticated user. As explained above, the information may be obtained from multiple databases and possibly from multiple systems. The system may identify the subject entity based on an association between the ticket and the subject entity. This may be explicit, e.g., a record linking the subject entity to the ticket. This may be implicit, e.g., linking the communication address to which the invitation was sent to the ticket and identifying the subject entity linked to the communication address. The system may also generate a session identifier. This session identifier is communicated back to the client, e.g., as metadata for the anonymized interface. In other words, the session identifier may not be displayed and a user of the anonymized interface therefore need not be aware of the session identifier. The system may also generate mock identifiers to be included in the user interface (235). The system may generate a mock identifier for each identifier that will be sent to the client device as part of the user interface. These mock identifiers may be used to make certain functionality operable. For example, if the user interface includes a link or other control that enables the user to get more information about a data item, an identifier for that data item may be replaced with a mock identifier. The mock identifier may be part of the link, but may not (but could be) displayed on the view area. The mock identifiers are each paired with the identifier it replaces in the interface. A mock identifier-identifier pair is tied to the session identifier. Each session identifier can have one or more pairs. Accordingly, the mock identifiers are valid only during the session with which they are associated. This provides further protection from attempts at unauthorized access to the information, as the mock identifiers expire after a short period.

But even if a bad actor intercepts the invitation, the bad actor receives no protected information because the system replaces the identifiers that will be sent with the mock identifiers and removes any other protected information (240) from the user interface, such as personally identifiable information. This information can be removed as it is assumed that the person viewing the information has a right to view it and does not need the additional personally identifying information to benefit from the other information presented in the user interface. The system finishes generating the information used to generate the automatically anonymized user interface, which includes the session identifier, which is sent to the client and then displayed on the client (245).

As indicated earlier, because the user interface is not a push notification and can still be interacted with, process 200, which populates the data structures needed to provide the anonymized user interface, ends. Interactions may continue using the mapping of the session identifier to mock identifier-identifier pairs, as discussed with regard to FIG. 3.

Figure 3:
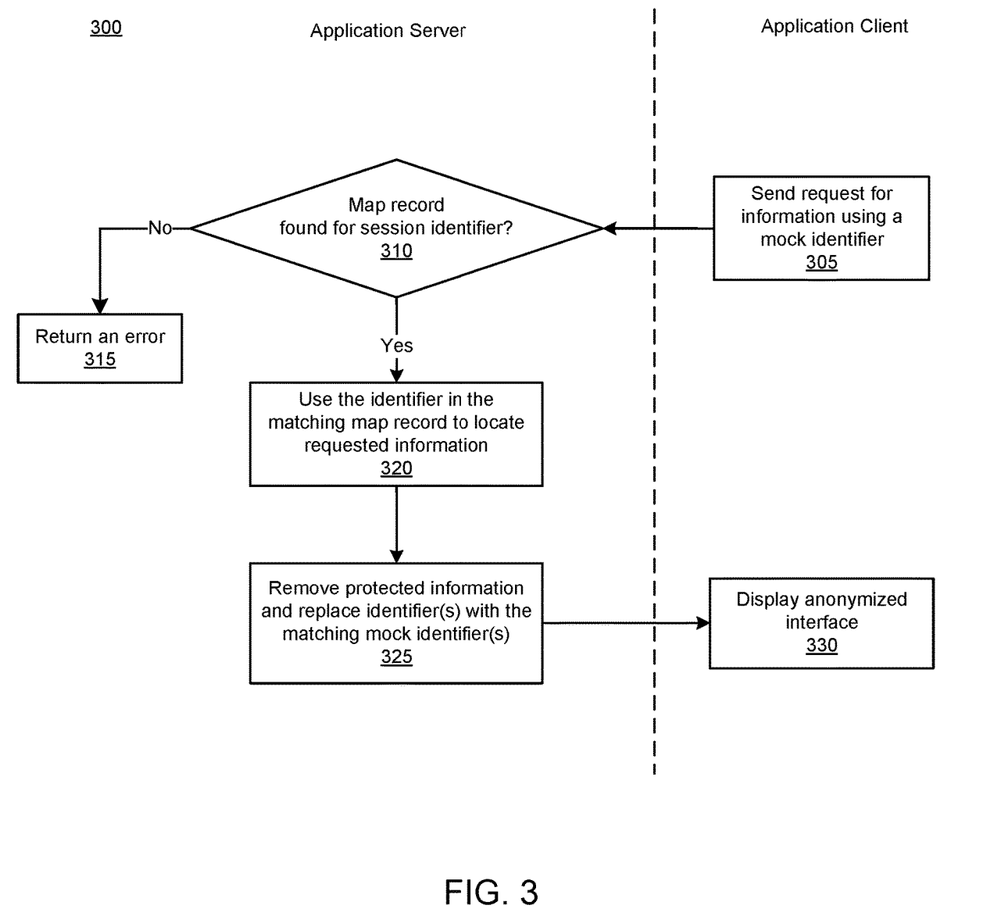
FIG. 3 illustrates a flowchart of an example process for providing an automatically anonymized version of a follow-on user interface, according to a disclosed implementation.

FIG. 3 illustrates a flowchart of an example process 300 for providing an automatically anonymized version of a follow-on user interface, according to a disclosed implementation. Process 300 may be performed by a system such as system 100 of FIG. 1 after an initial anonymized user interface has been presented to a user. The process 300 enables interactions with the anonymized user interface. In other words, process 300 enables the user to request additional information from the anonymized user interface, as a follow-on user interface.

Process 300 begins after a request for information is made from the anonymized user interface of the application client (305). The request for information includes the session identifier and at least one mock identifier. The system looks for a map entry, e.g., in identifier map 124, that matches the session identifier (310). If the system fails to find an entry for the session identifier (310, No), the system returns an error message (315). The error message may indicate that the session expired. In some implementations, if the system is unable to find an entry for the session identifier that includes the mock identifier (310, No) the system may return an error (315). The error may indicate there was an error trying to access the requested information, or some other error appropriate for the implementation.

If a map entry is located (310, Yes), the system may use the map entry to translate the mock identifiers to the protected identifiers and locate the requested information (320). In other words, the system may use the identifiers from mock identifier-identifier pairs to obtain the requested information from the various data stores. As one example, a student can click on a grade for a class to request a follow-on user interface that will show grades for each individual assignment. In some implementations, the class may have a mock identifier, which obscures the real class identifier. The system may use this mock identifier and the map entries to find the actual class identifier and to find the identifier of the student, which was not present in the request. The system may use the actual class identifier to find assignments for that student. The system then anonymizes the data, removing personal information and/or replacing identifying information with mock identifiers (325). Thus, the follow-on user interface is also automatically anonymized and displayed to the client (330). The follow-on user interface may also be interactive, and may lead to additional interactions, which may themselves invoke process 300. Importantly, all protected information, including information that can be used to identify an individual and any other information considered protected by the organization, is removed from the user interface, either via replacement with a mock identifier or removal.

Figure 4:
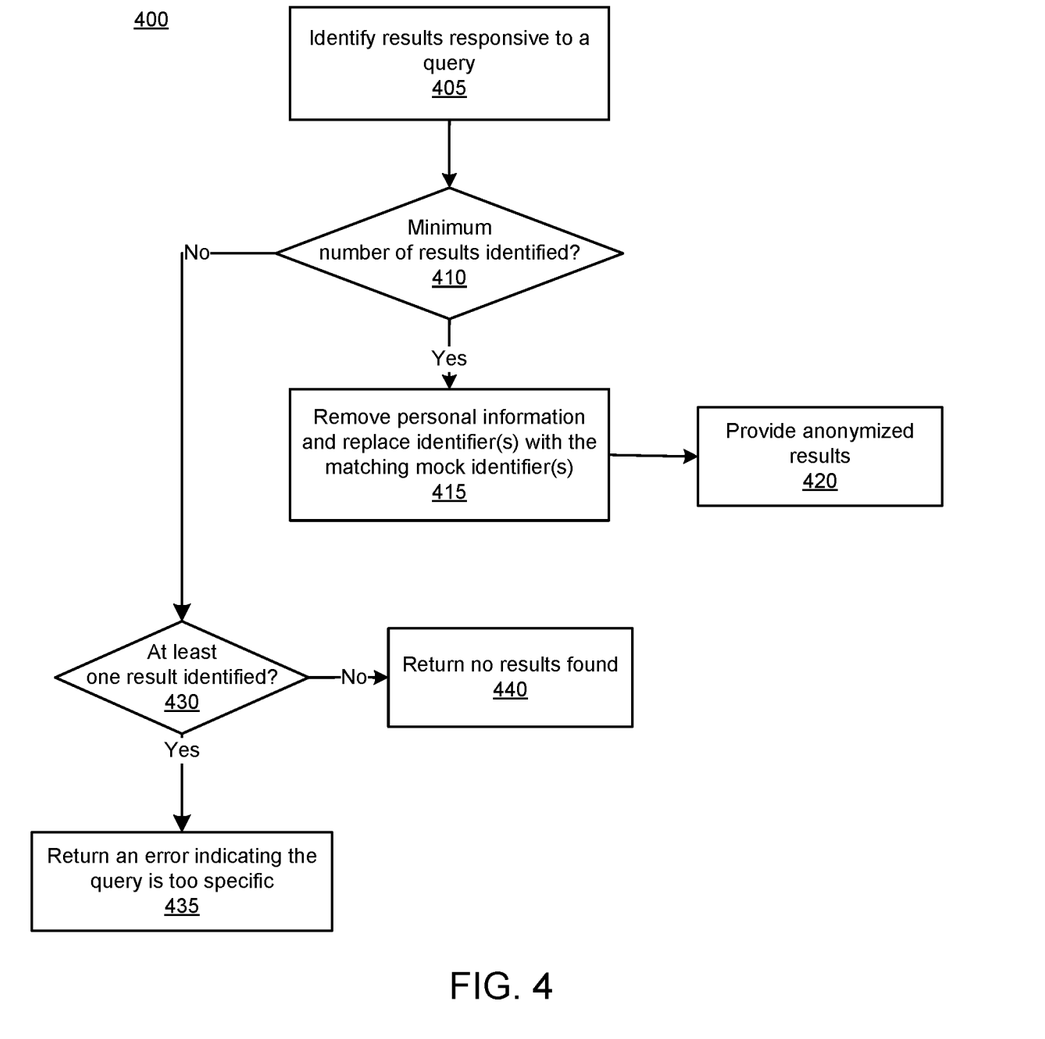
FIG. 4 illustrates flowchart of an example process for requesting automatically anonymized research records, according to a disclosed implementation.

FIG. 4 illustrates flowchart of an example process 400 for requesting automatically anonymized research records, according to a disclosed implementation. Process 400 may also be performed by an automatic anonymization system, such as system 100 of FIG. 1. The process 400 enables the request of information, for example for research purposes, from a system. The system may be under obligations to protect certain information, including personally identifiable information. Process 400 ensures that any query includes enough responsive records to ensure the data stays anonymized and automatically removes protected information. However, for a particular session, the records may be interactive, where feasible, using the mock identifiers.

Process 400 begins by identifying results that are responsive to a query (405). The system then determines whether a minimum number of results have been identified (410). This step ensures that the results include a sufficient number of records that the records cannot be tied back to any one person. This minimum number is implementation and information dependent. If there are not a sufficient number of results (410, No), but there is at least one result (430, Yes), the system may return an error indicating the query is too specific (435). This lets the query requestor modify the query parameters and try again. If no records are identified (430, No), the system may indicate no records were found (440). In either case, process 400 ends.

If a minimum number of responsive records are identified (410, yes), the system may remove any protected information (including personally identifiable information) from the records (415). If there are any identifiers that are provided, these may be replaced with mock identifiers, as discussed herein. These identifiers may be linked to a session identifier, so that the research can use an interactive interface during the session but not beyond. The system may provide the anonymized results to the query requestor (420).

Figure 5:
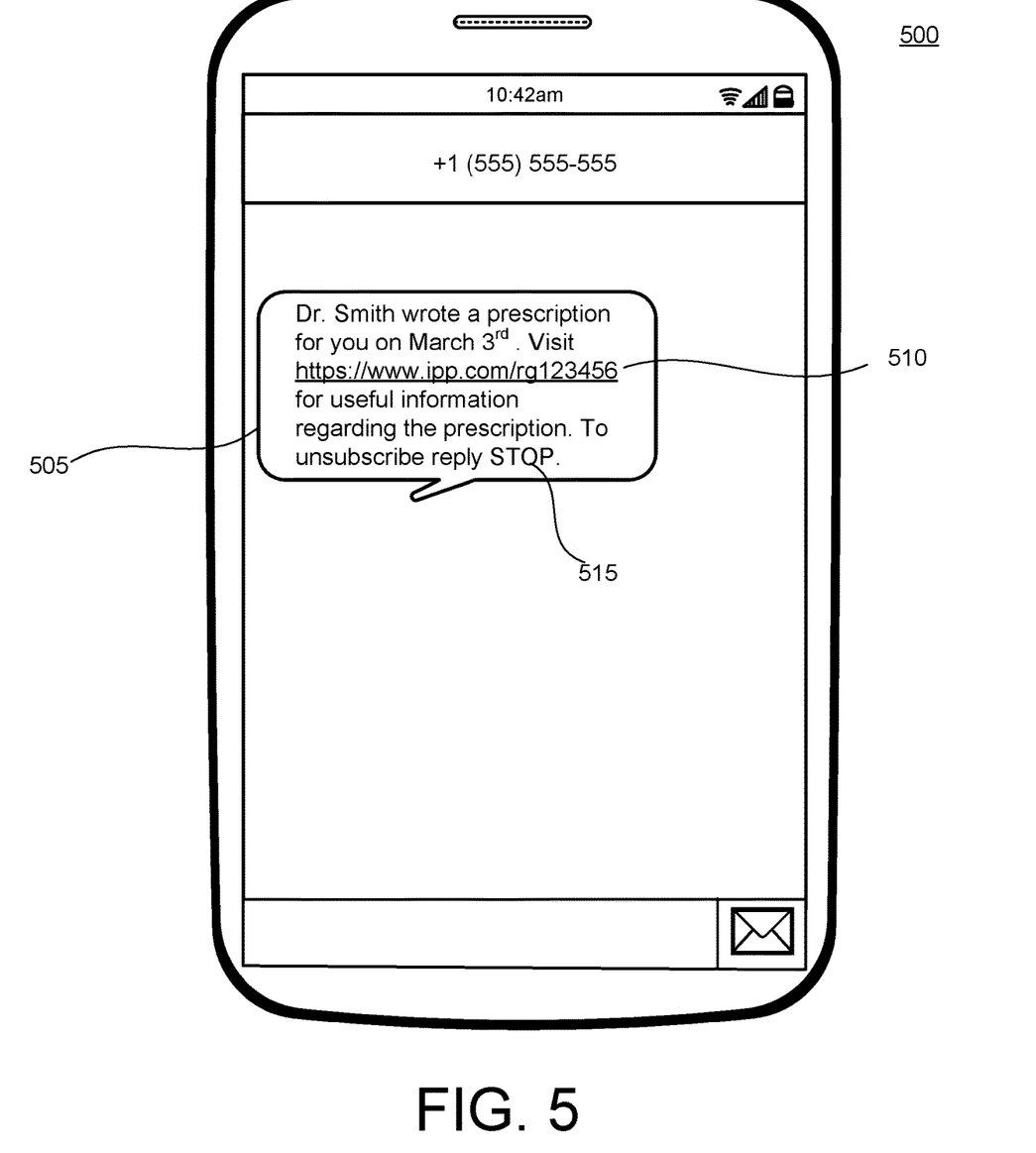
FIG. 5 illustrates an example user interface displaying an invitation with a ticket, according to a disclosed implementation.

FIG. 5 illustrates an example user interface 500 displaying an invitation 505 with a ticket, according to a disclosed implementation. The invitation 505 in the example of FIG. 5 is a text message sent to a mobile phone, but invitations are not limited to text messages sent to a phone number. Invitations can include emails delivered to a specific email address or messages sent to a social media account identifier. The example of FIG. 5 is sent in response to a physician prescribing a new medication, but implementations are not so limited and similar notifications may be sent in response to other events. The invitation 505 includes a selectable control that includes a ticket 510. The control in the example of invitation 505 is a link. The link includes the ticket 510, although in some implementations the ticket (or ticket identifier) may be part of the href (URL) of the link but the text itself may not display the ticket. The control can also be a button or image or icon that, when selected, causes the user device to send an HTML request (or equivalent request) to the server. The request includes the ticket. The invitation 505 and ticket 510 are generated specifically for a particular user, e.g., the subject entity or guardian of the subject entity. In some implementations, the address in the uniform resource locator (URL) may be unique to the user and correspond to the ticket. In some implementations, the ticket may be a parameter in the URL that makes the link unique to the user. The ticket 510 may be valid for a limited period of time, after which the user can no longer use the link to access the anonymized user interface. In some implementations, the invitation may also include an opt-out option 515. The opt-out option 515 may be a way for the user to indicate a desire not to receive invitations in the future. If the user uses the opt-out option 515 the system may update information, e.g., trigger criteria, so that the system will not generate future invitations even if another triggering event would otherwise generate the invitation.

Figure 6A:
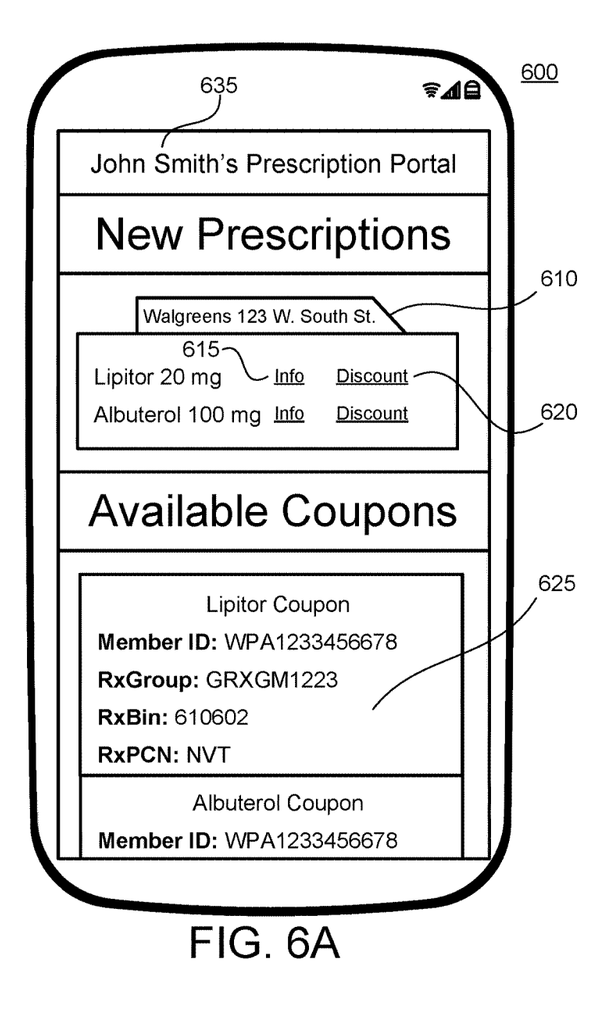
FIGS. 6A and 6B illustrates a user interface configured for access via authentication and configured for access via ticket presentation, according to a disclosed implementation.
Figure 6B:
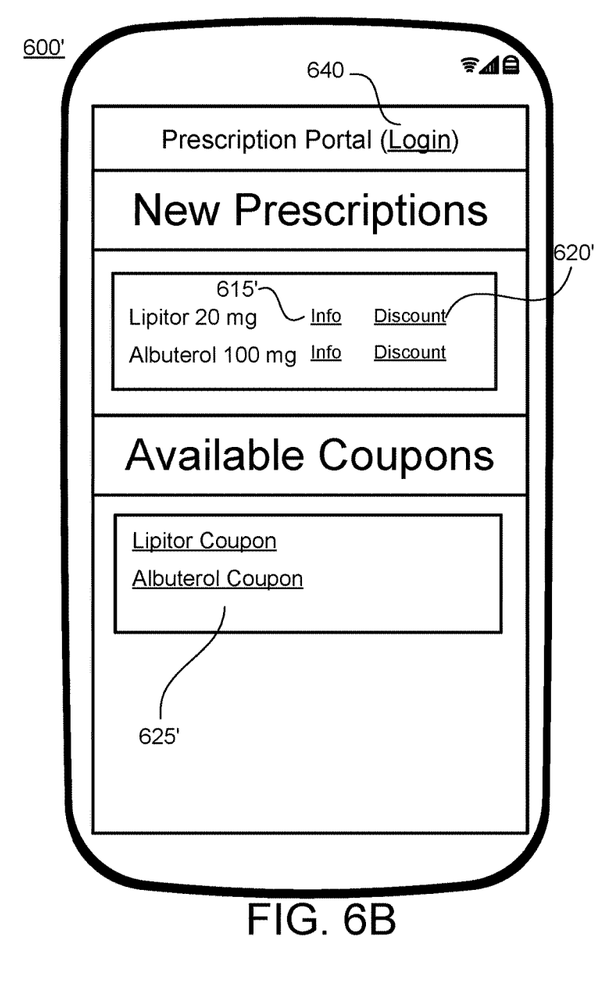

FIGS. 6A and 6B illustrates a user interface 600 configured for access via authentication and the user interface 600' configured for access via ticket presentation, according to a disclosed implementation. The user interface 600 represents an authenticated, and thus non-anonymized version, of the user interface. In the example of FIGS. 6A and 6B, the interface is related to a patient prescription portal, although implementations include other types of portals/interfaces. The information about prescriptions is protected information governed by regulations and is therefore protected information. The user interface 600 represents a conventional version of the user interface, which requires authentication. The user interface 600 includes protected information, such as the user's name 635 and the address of the pharmacy 610 to which the new prescription was sent. The links 615 and 620 may also include protected information, for example the prescription number of the medications. The links 615 and/or 620 may be requests for follow-on user interfaces and represent the interactive nature of the user interface 600. In addition, the discount information 625 may include protected information, such as details relating to health care coverage that facilitate obtaining a discount at a pharmacy. The information included in the user interface 600 provides an example of the kinds of protected information that a user interface may display when accessed via authentication, but implementations are not limited to the information illustrated nor are implementations limited to health care settings and medical records.

The user interface 600' of FIG. 6B illustrates an automatically anonymized version of the user interface. The user interface 600' is presented when accessed via ticket presentation. The two user interfaces 600 and 600' therefore represent different versions of the same user interface. Which interface is displayed to the user depends on whether access is via authentication or via ticket presentation. In the user interface 600' the user's name 635 is removed. In place, the user interface 600 can include a login link 640 so that the user can switch to user interface 600, if desired. The login link 640 is optional. The user interface 600' also lacks the information about the pharmacy 610 at which the prescription is being filled. This information may be considered protected information and is removed from the user interface 600'. The user interface 600' may include links 615' and 620', but the links differ from links 615 and 620 because the prescription identifiers in the links have been replaced with mock identifiers, as described herein. Thus, although the text displayed for the links 615' and 620' is the same as for 615 and 620, the links (href addresses) behind the links are different. The discount information 625' also differs from the discount information 625 because the information about the health insurance has been removed.

In addition to the configurations described above, an apparatus can include one or more apparatuses in computer network communication with each other or other devices. In addition, a computer processor can refer to one or more computer processors in one or more apparatuses or any combinations of one or more computer processors and/or apparatuses. An aspect of an implementation relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of implementations described can be implemented in any type of apparatus that can execute instructions or code.

More particularly, programming or configuring or causing an apparatus or device, for example, a computer, to execute the described functions of implementations creates a new machine where in case of a computer a general purpose computer in effect becomes a special purpose computer once it is programmed or configured or caused to perform particular functions of the implementations pursuant to instructions from program software. According to an aspect of an implementation, configuring an apparatus, device, computer processor, refers to such apparatus, device or computer processor programmed or controlled by software to execute the described functions.

A program/software implementing the implementations may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the implementations may be transmitted over a transmission communication path, e.g., a wire and/or a wireless network implemented via hardware. An example of communication media via which the program/software may be sent includes, for example, a carrier-wave signal.

The many features and advantages of the implementations are apparent from the detailed specification and, thus, it is intended by the appended claims to cover all such features and advantages of the implementations that fall within the true spirit and scope thereof. Further, since numerous modifications and changes will readily occur to those skilled in the art, it is not desired to limit the inventive implementations to the exact construction and operation illustrated and described, and accordingly all suitable modifications and equivalents may be resorted to, falling within the scope thereof.

Those skilled in the art will recognize that the present teachings are amenable to a variety of modifications and/or enhancements. For example, the automatic anonymization system and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In one general aspect, a method includes sending a communication to a communication address for a subject entity, the communication including a ticket generated for the subject entity, and receiving a request for information that includes the ticket. Responsive to determining that the ticket is valid the method further includes obtaining information for the subject entity, generating a session identifier, removing protected information from the information, and for each of at least one protected identifier in the information: generating a respective mock identifier, adding a map record that includes the session identifier, the protected identifier, and the respective mock identifier; and replacing the protected identifier with the respective mock identifier in the information. The method further includes providing a user interface configured to provide the information to a device associated with the session identifier.

These and other aspects may include one or more of the following features. For example, the method may also include associating the session identifier with a level of authorization that indicates access is based on ticket presentation. In some such implementations, the method may further include receiving a second request for information that includes the session identifier and a first mock identifier, determining that the session identifier has the association with the level of authorization that indicates access based on ticket presentation, and responsive to the determination: locating the map record for the session identifier and the first mock identifier, using the protected identifier in the map record to obtain second information that is responsive to the second request, removing protected information from the second information, and providing the second information for display in a user interface associated with the communication address. Responsive to failure to locate a map record for the session identifier, some such implementations may include providing an error response.

As another example, the method may include receiving a second request for information that includes a session identifier and a first mock identifier; locating the map record for the session identifier and the first mock identifier; and responsive to locating the map record: using the protected identifier in the map record to obtain second information that is responsive to the second request, removing protected information from the second information, and providing the second information for display in a user interface associated with the communication address. In some such implementations, for each of at least one protected identifier in the second information that lacks a map record for the session identifier, the method may include generating another mock identifier; adding a map record that includes the session identifier, the at least one protected identifier, and the other mock identifier, and replacing the at least one protected identifier with the other mock identifier in the second information.

As another example, determining that the ticket is valid can include determining whether the ticket is expired, wherein the ticket is not valid responsive to determining that the ticket is expired and/or determining whether a record associating the ticket with the subject entity exists in a data store, wherein the ticket is not valid responsive to determining that the record does not exist in the data store. As another example, the ticket may be included in a link in the communication. As another example, the communication is sent responsive to a physician prescribing a new medication and the protected identifiers and the protected information are personal health information. As another example, the communication is sent responsive to a financial transaction. As another example, the information includes the protected information and the user interface is configured to display the protected information responsive to determining that the session identifier is associated with a successful login.

According to certain aspects, a system includes at least one processor and memory storing an identifier map, associations between tickets and subject entities, and instructions that, when executed by the at least one processor, cause the system for perform operations. The identifier map stores at least one entry that maps a session identifier to at least one mock identifier-protected identifier pair. The operations may include receiving a request for information that includes a ticket and determining that the ticket matches an entry in the associations between tickets and subject entities. Responsive to determining that the ticket matches the entry the operations may include generating a session identifier, obtaining information from a database for a subject entity associated with the ticket in the associations, removing protected information from the information and for each of at least one protected identifier in the information: generating a mock identifier for a mock identifier-protected identifier pair, replacing the protected identifier with the mock identifier in the information, and adding an entry to the identifier map that includes the generated session identifier and at the mock identifier-protected identifier pair. The operations may also include providing a user interface configured to provide access to the information and to provide the generated session identifier to a computing device that provided the request for information.

These and other aspects can include one or more of the following features, alone or in combination. For example, entries in the associations between tickets and subject entities may expire after predetermined time and/or entries in the identifier map expire after a predetermined time. As another example, the operations may also include receiving a second request for information that includes a first session identifier and a first mock identifier, identifying an entry in the identifier map for the first session identifier, and responsive to identifying the entry for the first session identifier: using the protected identifiers from the mock identifier-protected identifier pairs of the entry to obtain second information that is responsive to the second request, replacing, in the second information, protected identifiers with the corresponding mock identifier of the mock identifier-protected identifier pairs, removing protected information from the second information, and providing a user interface configured to provide access to the second information. In some such implementations, the operations may also include providing an error response responsive to failure to locate a map record for the first session identifier. As another example, the operations may also include associating the generated session identifier with a level of authorization that indicates access via ticket presentation responsive to determining that the ticket matches the entry in the associations. In some such implementations, the user interface may be configured to display the protected information responsive to determining that the generated session identifier is associated with a level of authorization that indicates access via authentication. As another example, the operations may also include, responsive to failure to locate an entry in the associations between tickets and subject entities that matches the ticket, providing an error response.

According to one aspect, a method may include identifying results responsive to a query, determining whether a minimum number of results are identified, and responsive to determining that the minimum number of results are identified: generating a session identifier, generating a respective mock identifier for each protected identifier in the results, adding an entry to an identifier map for each protected identifier that associates the session identifier with and the protected identifier and its respective mock identifier, replacing each protected identifier with its respective mock identifier in the results, removing protected information from the results, and providing a user interface configured to provide the session identifier and access to the results to a requestor of the query. In some implementations, a protected identifier is an identifier linked to a person that is in the results provided to the requestor.

In another aspect, a computer program product embodied on a computer-readable storage device includes instructions that, when executed by at least one processor formed in a substrate, cause a computing device to perform any of the disclosed methods, operations, or processes disclosed herein.

What is claimed is:

1. A method comprising:
sending a communication to a communication address for a subject entity, the communication including a ticket generated for the subject entity;
receiving a request for information that includes the ticket;
responsive to determining that the ticket is valid:
obtaining information for the subject entity,
generating a session identifier,
for each of at least one protected identifier in the information:
generating a respective mock identifier;
adding a map record that includes the session identifier, the protected identifier, and the respective mock identifier; and
replacing the protected identifier with the respective mock identifier in the information,
removing protected information from the information, and
providing the session identifier with a user interface configured to display the information, which lacks the protected information, to a device associated with the request;
receiving a second request for information that includes a session identifier and a first mock identifier;
locating the map record for the session identifier and the first mock identifier; and
responsive to locating the map record:
using a protected identifier in the map record to obtain second information that is responsive to the second request,
removing protected information from the second information, and
providing the second information for display in a user interface associated with the communication address.

2. The method of claim 1, further comprising associating the session identifier with a level of authorization that indicates access is based on ticket presentation.

3. The method of claim 2, further comprising:
determining that the session identifier has the association with the level of authorization that indicates access based on ticket presentation,
wherein, locating the map record is performed responsive to determining that the session identifier has the association with the level of authorization that indicates access based on ticket presentation.

4. The method of claim 1, further comprising, responsive to failure to locate a map record for the session identifier, providing an error response.

5. The method of claim 1, further comprising, for each of at least one protected identifier in the second information that lacks a map record for the session identifier:
generating another mock identifier;
adding a map record that includes the session identifier, the at least one protected identifier, and the other mock identifier; and
replacing the at least one protected identifier with the other mock identifier in the second information.

6. The method of claim 1, wherein determining that the ticket is valid includes:
determining whether the ticket is expired,
wherein the ticket is not valid responsive to determining that the ticket is expired.

7. The method of claim 1, wherein determining that the ticket is valid includes:
determining whether a record associating the ticket with the subject entity exists in a data store,
wherein the ticket is not valid responsive to determining that the record does not exist in the data store.

8. The method of claim 1, wherein the ticket is included in a link in the communication.

9. The method of claim 1, wherein the communication address for the subject entity is associated with a patient, the communication is sent responsive to a physician prescribing a new medication, and the protected identifiers and the protected information are personal health information.

10. The method of claim 1, wherein the information includes the protected information and the user interface is configured to display the protected information responsive to determining that the session identifier is associated with a successful login.

11. A system comprising:
at least one processor; and
memory storing:
an identifier map, the identifier map storing at least one entry that maps a session identifier to at least one mock identifier-protected identifier pair;
associations between tickets and subject entities; and
instructions that, when executed by the at least one processor, cause the system for perform operations including:
receiving a request for information that includes a ticket,
determining that the ticket matches an entry in the associations between tickets and subject entities,
responsive to determining that the ticket matches the entry:
generating a session identifier;
obtaining information from a database for a subject entity associated with the ticket in the associations;
for each of at least one protected identifier in the information:
generating a mock identifier for a mock identifier-protected identifier pair,
replacing the protected identifier with the mock identifier in the information, and
adding an entry to the identifier map that includes the generated session identifier and the mock identifier-protected identifier pair;
removing protected information from the information; and
providing a user interface configured to provide access to the information and to provide the generated session identifier to a computing device that provided the request for information;
receiving a second request for information that includes a first session identifier and a first mock identifier,
identifying an entry in the identifier map for the first session identifier, and
responsive to identifying the entry for the first session identifier:
using a protected identifier from the mock identifier-protected identifier pairs of the entry to obtain second information that is responsive to the second request, replacing, in the second information, at least one protected identifier with a corresponding mock identifier of the at least one protected identifier from the mock identifier-protected identifier pairs, removing protected information from the second information, and providing a user interface configured to provide access to the second information.

12. The system of claim 11, wherein entries in the associations between tickets and subject entities expire after predetermined time.

13. The system of claim 11, wherein entries in the identifier map expire after a predetermined time.

14. The system of claim 11, the memory further stores instructions that, when executed by the at least one processor, cause the system to perform operations comprising, responsive to failure to locate a map record for the first session identifier, providing an error response.

15. The system of claim 11, wherein the memory further stores instructions that, when executed by the at least one processor, cause the system to perform operations comprising associating the generated session identifier with a level of authorization that indicates access via ticket presentation responsive to determining that the ticket matches the entry in the associations.

16. The system of claim 15, wherein the user interface is configured to display the protected information responsive to determining that the generated session identifier is associated with a level of authorization that indicates access via authentication.

17. The system of claim 11, further comprising, responsive to failure to locate an entry in the associations between tickets and subject entities that matches the ticket, provide an error response.

18. A non-transitory computer-readable medium storing instructions that, when executed by at least one processor, cause a computing system to:

send a communication to a communication address for a subject entity, the communication including a ticket generated for the subject entity;

receive a request for information that includes the ticket;

determine whether the ticket is valid;

responsive to determining that the ticket is valid:
obtain information for the subject entity,
generate a session identifier,
for each of at least one protected identifier in the information:
generate a respective mock identifier;
add a map record that includes the session identifier, the protected identifier, and the respective mock identifier; and
replace the protected identifier with the respective mock identifier in the information, and
provide a user interface configured to provide the information to a device associated with the session identifier;

receive a second request for information that includes a session identifier and a first mock identifier;

locate the map record for the session identifier and the first mock identifier; and responsive to locating the map record:
use a protected identifier in the map record to obtain second information that is responsive to the second request,
remove protected information from the second information, and
provide the second information for display in a user interface associated with the communication address.

19. The non-transitory computer-readable medium of claim 18, further storing instructions that cause the computing system to, responsive to failure to locate an entry in the associations between tickets and subject entities that matches the ticket, provide an error response.

20. The non-transitory computer-readable medium of claim 18, further storing instructions that cause the computing system to:

associate the session identifier with a level of authorization that indicates access is based on ticket presentation; and determine whether the session identifier has the association with the level of authorization that indicates access based on ticket presentation, wherein, locating the map record is performed responsive to determining that the session identifier has the association with the level of authorization that indicates access based on ticket presentation.

* * * * *